United States Patent
Lee et al.

(10) Patent No.: US 8,142,529 B2
(45) Date of Patent: Mar. 27, 2012

(54) FUEL PROCESSOR HAVING CARBON MONOXIDE REMOVING UNIT AND METHOD OF OPERATING THE SAME

(75) Inventors: Hyun-chul Lee, Yongin-si (KR); Soon-ho Kim, Yongin-si (KR); Doo-hwan Lee, Yongin-si (KR); Kang-hee Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 940 days.

(21) Appl. No.: 11/740,535

(22) Filed: Apr. 26, 2007

(65) Prior Publication Data
US 2008/0044699 A1 Feb. 21, 2008

(30) Foreign Application Priority Data
Aug. 17, 2006 (KR) ........................ 10-2006-0077780

(51) Int. Cl.
*B01J 7/00* (2006.01)
*H01M 8/06* (2006.01)
*C01B 3/36* (2006.01)
*C01B 6/24* (2006.01)
*C01B 3/02* (2006.01)

(52) U.S. Cl. ......... 48/61; 48/197 R; 423/644; 423/648.1
(58) Field of Classification Search .......... 48/61, 197 R; 423/650
See application file for complete search history.

(56) References Cited

U.S. PATENT DOCUMENTS

| | | | |
|---|---|---|---|
| 4,184,322 A * | 1/1980 | Paull et al. | 60/780 |
| 6,309,768 B1 | 10/2001 | Patterson, Jr. et al. | |
| 0,136,936 A1 | 9/2002 | Grieve et al. | |
| 6,755,015 B1 | 6/2004 | Manaka | |
| 6,793,027 B1 * | 9/2004 | Yamada et al. | 180/65.1 |
| 7,641,889 B1 * | 1/2010 | Salinas et al. | 423/658.2 |

(Continued)

FOREIGN PATENT DOCUMENTS
JP 4-196061 7/1992
(Continued)

OTHER PUBLICATIONS

Machine Translation and English Language Abstract of JP 2004-189510A (Dec. 15, 2010).*

(Continued)

*Primary Examiner* — Matthew Merkling
(74) *Attorney, Agent, or Firm* — Christie, Parker & Hale, LLP (57) ABSTRACT

A fuel processor having a CO removal unit including an apparatus for warming a CO shifter, is provided. A method of using the fuel processor is also provided. The fuel processor includes a reformer that extracts hydrogen gas from a raw fuel by reacting the raw fuel with water. A burner heats up the reformer to a temperature suitable for extracting the hydrogen gas. A CO shifter removes CO produced during the extraction reaction from the hydrogen gas, and a medium path line in which a heat exchange medium disposed therein absorbs heat from the reformer and passes the heat to the CO shifter. A fuel processor having the above structure can greatly reduce the time required to increases the temperature of the CO shifter to an appropriate operating temperature at an early stage of start up, since a rapid heating of the CO shifter is possible using the heat exchange of steam.

11 Claims, 5 Drawing Sheets

U.S. PATENT DOCUMENTS

| | | | |
|---|---|---|---|
| 2003/0010020 A1 | 1/2003 | Taga et al. | |
| 2003/0017374 A1 | 1/2003 | Edlund et al. | |
| 2003/0093949 A1* | 5/2003 | Goebel et al. | 48/127.9 |
| 2004/0035055 A1 | 2/2004 | Zhu et al. | |
| 2005/0227129 A1 | 10/2005 | Iio | |

FOREIGN PATENT DOCUMENTS

| | | |
|---|---|---|
| JP | 2000-219502 | 8/2000 |
| JP | 2001-176533 | 6/2001 |
| JP | 2001-210349 | 8/2001 |
| JP | 2002003201 A * | 1/2002 |
| JP | 2002-293510 | 10/2002 |
| JP | 2003-077511 | 3/2003 |
| JP | 2003-086210 | 3/2003 |
| JP | 2003-300703 | 10/2003 |
| JP | 2004-119214 | 4/2004 |
| JP | 2004-178975 | 6/2004 |
| JP | 2004-185941 | 7/2004 |
| JP | 2004189510 A * | 7/2004 |
| JP | 2004-323353 | 11/2004 |
| JP | 2005-043186 | 2/2005 |
| JP | 2005-170741 | 6/2005 |
| JP | 2005-353497 | 12/2005 |
| JP | 2006-202564 | 8/2006 |
| KR | 10-2003-0048109 | 6/2003 |
| KR | 10-2004-0097305 | 11/2004 |
| KR | 10-2006-0034428 | 4/2006 |

OTHER PUBLICATIONS

Machine Translation and English Language Abstract of JP 2002-003201A (Dec. 15, 2010).*

Korean Office Action dated Aug. 28, 2007, issued in corresponding Korean Application No. 10-2006-0076371.
Chinese Office Action dated Oct. 17, 2008, issued in corresponding Chinese Application No. 2007100052326.
Chinese Certificate of Patent No. ZL 2007 1 0005232 issued in the corresponding Chinese application on Aug. 19, 2009 (including the Chinese application CN 100530800C).
U.S. Appl. No. 11/675,339, filed Feb. 15, 2007, Hyun-chul Lee et al., Samsung SDI Co., Ltd.
Office Action issued by the Japanese Patent Office on Jun. 29, 2010.
Office Action issued in corresponding Korean Patent Application No. 2006-0077780 dated Aug. 28, 2007.
Office Action issued in Chinese Patent Application No. 2007100052294 on Nov. 28, 2008.
Certificate of Patent No. ZL 200710005229, issued in the corresponding Chinese application by the Chinese Intellectual Property Office on Sep. 23, 2009 (including the Chinese application CN 100544103C).
Nov. 4, 2010 Office action (U.S. Appl. No. 11/675,339).
KIPO Office action dated Apr. 16, 2008, for Korean priority Patent application 10-2008-0077780, 4 pages.
Patent Abstracts of Japan, and English machine translation of Japanese Publication 2000-219502, 33 pages.
Patent Abstracts of Japan, and English machine translation of Japanese Publication 2001-176533, 22 pages.
Patent Abstracts of Japan, and English machine translation of Japanese Publication 2003-077511, 15 pages.
Patent Abstracts of Japan, and English machine translation of Japanese Publication 2004-119214, 19 pages.

* cited by examiner

FUEL PROCESSOR HAVING CARBON MONOXIDE REMOVING UNIT AND METHOD OF OPERATING THE SAME

CROSS-REFERENCE TO RELATED APPLICATIONS

This application claims the benefit of Korean Application No. 2006-77780, filed on Aug. 17, 2006, in the Korean Intellectual Property Office, the disclosure of which is incorporated herein by reference.

BACKGROUND OF THE INVENTION

1. Field of the Invention

Aspects of the present invention relate to a fuel processor that reforms a fuel to be suitable for supplying to a fuel cell, and particularly, to a fuel processor having a CO removal apparatus that has an improved warming-up structure and a method of operating the fuel processor.

2. Description of the Related Art

Figure 1:
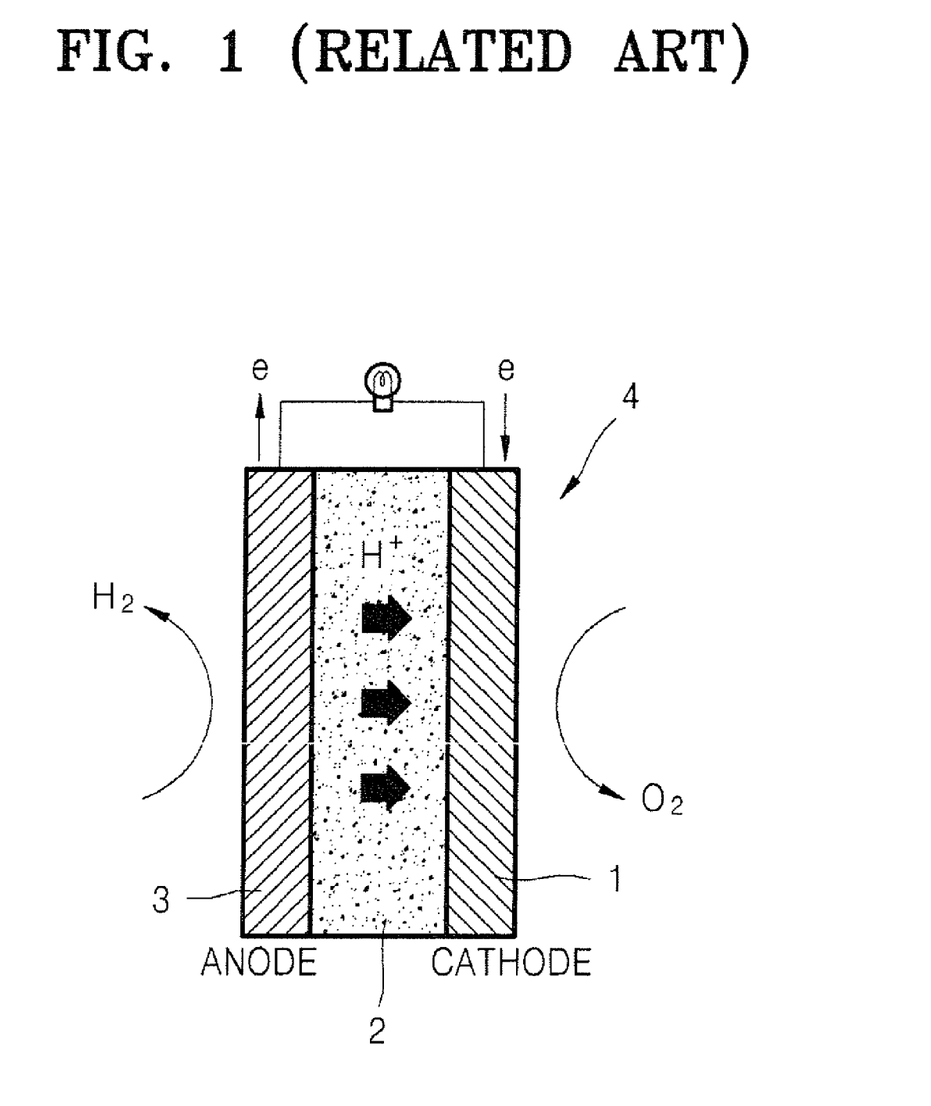
FIG. 1 is a schematic drawing illustrating the principle of electricity generation of a conventional fuel cell.
Figure 2:
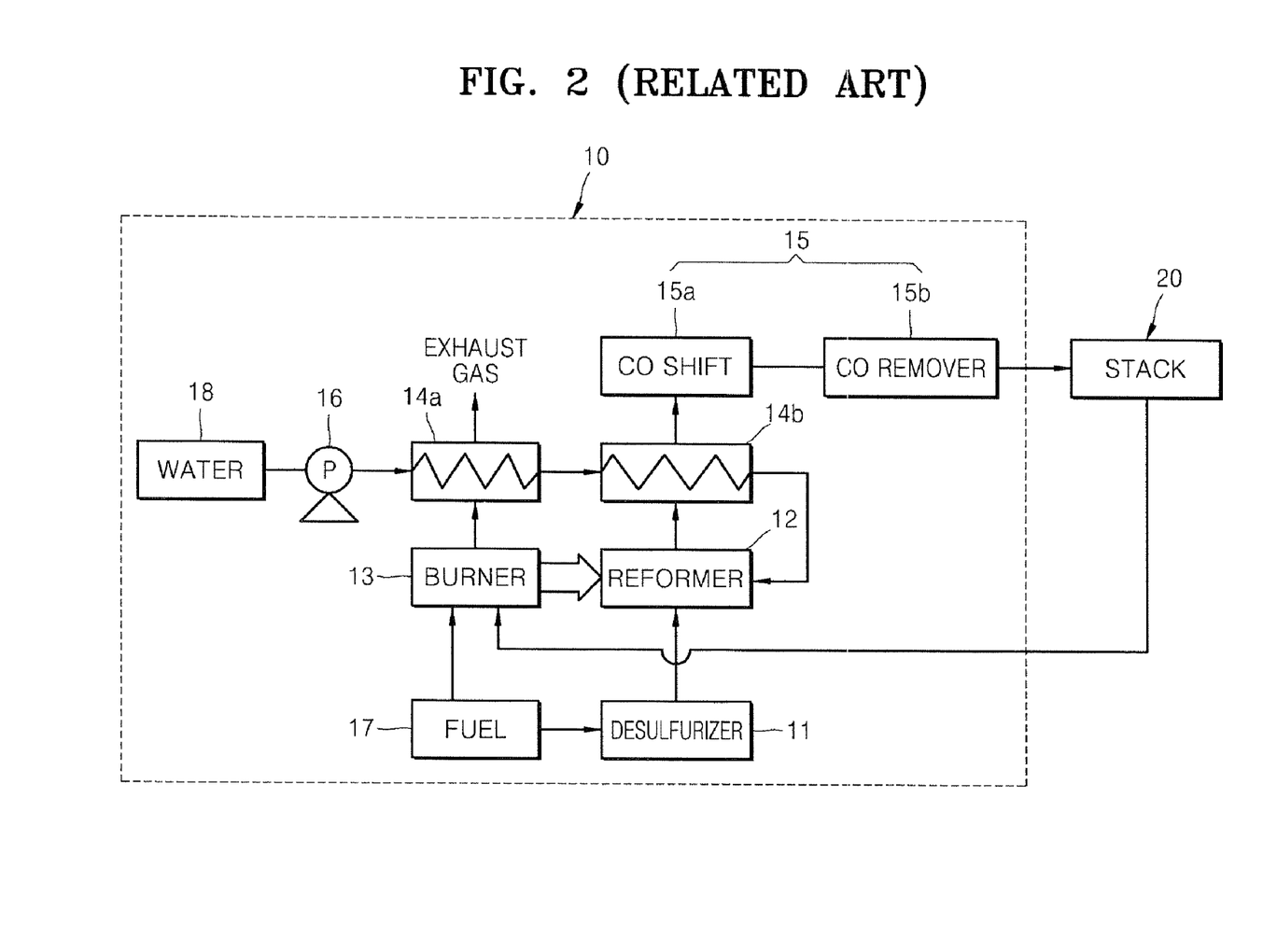
FIG. 2 is a block diagram showing a configuration of a conventional fuel processor that processes a fuel that is to be supplied to a fuel cell.

A fuel cell is an electrical generator that changes chemical energy of a fuel into electrical energy through a chemical reaction, and can continuously generate electricity as long as the fuel is supplied. FIG. 1 is a schematic drawing illustrating the energy transformation structure of a fuel cell, and FIG. 2 is a block diagram showing a configuration of a conventional fuel processor that processes a fuel that is to be supplied to a fuel cell. Referring to FIG. 1, when air that includes oxygen is supplied to a cathode 1 and a fuel containing hydrogen is supplied to an anode 3, electricity is generated by a reverse electrolysis reaction as water and protons move through an electrolyte membrane 2. However, a unit cell 4 does not generally produce a useful high voltage. Therefore, electricity is generated by a stack 20 (referring to FIG. 2) in which a plurality of unit cells 4 are connected in series.

A hydrocarbon group containing material such as a natural gas can be used as a fuel source for supplying hydrogen to the stack 20. Hydrogen is often extracted from a fuel source in a fuel processor 10, as depicted in FIG. 2, in order to supply hydrogen to the stack 20.

The fuel processor 10 includes a desulfurizer 11, a reformer 12, a burner 13, a water supply pump 16, first and second heat exchangers 14a and 14b, and a CO removal unit 15. The CO removal unit 15 comprises a CO shifter 15a and a CO remover 15b. The hydrogen extraction process is performed in the reformer 12. That is, hydrogen is generated in the reformer 12, through a chemical reaction 1 indicated below between a hydrocarbon group containing gas, that acts as the fuel source, entering from a fuel tank 17, and steam entering from a water tank 18, by the action of a water supply pump 16. The reformer 12, is heated by the burner 13.

$$CH_4+2H_2O \rightarrow CO_2+4H_2 \quad \text{[Chemical reaction 1]}$$

However, during the reaction, CO is generated, as well as $CO_2$, as a byproduct. If a fuel containing CO of 10 ppm or more is supplied to the stack 20, electrodes in the stack are poisoned, thereby greatly reducing the performance of the fuel cell. Therefore, the content of CO in an outlet of the reformer 12 is controlled to be 10 ppm or less by installing the CO shifter 15a and the CO remover 15b.

Chemical reaction 2, as indicated below, occurs in the CO shifter 15a, and chemical reactions 3, 4, and 5, as indicated below, occur in the CO remover 15b. The CO content in the fuel that has passed through the CO shifter 15a is 5,000 ppm or less and the CO content in the fuel that has passed through the CO remover 15b is reduced to 10 ppm or less.

$$CO+H_2O \rightarrow CO_2+H_2 \quad \text{[Chemical reaction 2]}$$

$$CO+\tfrac{1}{2}O_2 \rightarrow CO_2 \quad \text{[Chemical reaction 3]}$$

$$H_2+\tfrac{1}{2}O_2 \rightarrow H_2O \quad \text{[Chemical reaction 4]}$$

$$CO+3H_2 \rightarrow CH_4+H_2O \quad \text{[Chemical reaction 5]}$$

The desulfurizer 11 located at an inlet of the reformer 12 removes sulfur components contained in the fuel source. The sulfur components are absorbed while passing through the desulfurizer 11 because the sulfur components are very detrimental to the electrodes. Even if a sulfur component of 10 parts per billion (ppb) or more is supplied to the stack 20, electrodes can easily be poisoned.

When the fuel processor 10 is operating, a fuel source such as a natural gas is supplied to the reformer 12, through the desulfurizer 11, from the fuel tank 17. A portion of the fuel source is used as a fuel for igniting the burner 13. Then, steam that has entered through the first and second heat exchangers 14a and 14b reacts with the desulfurized fuel source, in the reformer 12, in order to generate hydrogen. The generated hydrogen is supplied to the stack 20 after the CO content is reduced to 10 ppm or less, while passing through the CO shifter 15a and the CO removal unit 15b.

When the fuel processor 10 starts after a long shutdown, the reformer 12 and the CO shifter 15a have cooled down to room temperature. With the reformer 12 and the CO shifter 15a at room temperature the fuel processor 10 is unable to instantly go into a normal operating condition, but can only perform normally after a few hours of heating. At this point, the temperature of the CO shifter 15a is more problematic as compared to the reformer 12. That is, the temperature of the reformer 12 can be increased to a desired level in a short time by directly heating it with the burner 13, but the CO shifter 15a requires additional time to reach a normal operating temperature because the CO shifter 15a is indirectly heated by gases entering from the reformer 12. A typical normal operating temperature of the reformer 12 is approximately 700° C., and a typical normal operating temperature of the CO shifter 15a is approximately 200° C. However, it takes only approximately 20 minutes for the reformer 12 to reach 700° C. after starting, but it takes approximately one hour for the CO shifter 15a to reach 200° C. Accordingly, although the reformer 12 has reached its normal operating temperature, the fuel processor 10 is unable to operate until the CO shifter 15a reaches its normal operating temperature. In other words, hydrogen gas can be produced in the reformer 12 in approximately 20 minutes after the start of the fuel processor 10, but in order to reduce the CO component in the gas below 5,000 ppm, the fuel processor 10 must wait one hour for the CO shifter to reach its normal operating temperature.

Accordingly, in order to reduce the time from starting to normal operation of the fuel processor 10, there is a need to develop a method of preheating the CO shifter 15a.

SUMMARY OF THE INVENTION

Aspects of the present invention provides a fuel processor having a CO removal unit which is improved so that an initial heating time of the CO removal unit can be reduced and a method of operating such a fuel processor.

According to an aspect of the present invention, there is provided a fuel processor comprising: a reformer that extracts hydrogen gas from a raw fuel by an extraction reaction with water; a burner that heats up the reformer to a temperature suitable for extracting the hydrogen gas; a CO (carbon monoxide) shifter that removes CO produced during the extraction reaction in the reformer; and a medium path line in which a heat exchange medium absorbs heat from the reformer and passes the heat to the CO shifter.

The heat exchange medium may be water, and the medium path line may be separated from a fuel line for moving the hydrogen gas. The medium path line can pass through an inner side of the CO shifter.

Valves may be respectively installed on an outlet of the medium path line, and in an outlet of the CO shifter, and the valves may be alternately opened and closed. The fuel processor may further comprise a CO removal reactor that removes CO (carbon monoxide) together with the CO shifter According to various aspects of the present invention, there is provided a method of operating a fuel processor in which hydrogen gas to be supplied to a stack is produced by reacting a raw gas, with water, in a reformer heated by a burner. CO components produced in the extracting process of the hydrogen gas are removed in a CO shifter. In some embodiments the method comprises: providing a medium path line for moving a heat exchange medium that absorbs heat in the reformer and passes the heat to the CO shifter; supplying water to the reformer by having a valve located on an outlet side of the CO shifter that is closed and a valve located on an outlet side of the medium path line that is opened when the temperature of the reformer reaches an appropriate temperature by heating the reformer using a burner at an early stage of start up; and shifting to a normal operation mode by supplying the raw gas together with water to the reformer by opening the valve located on the outlet of the CO shifter and closing the valve located on the outlet of the medium path line, when the temperature of the CO shifter reaches an appropriate temperature by the exchange of heat through the medium path line.

The appropriate temperature of the reformer and the CO shifter may be 100° C. or more.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
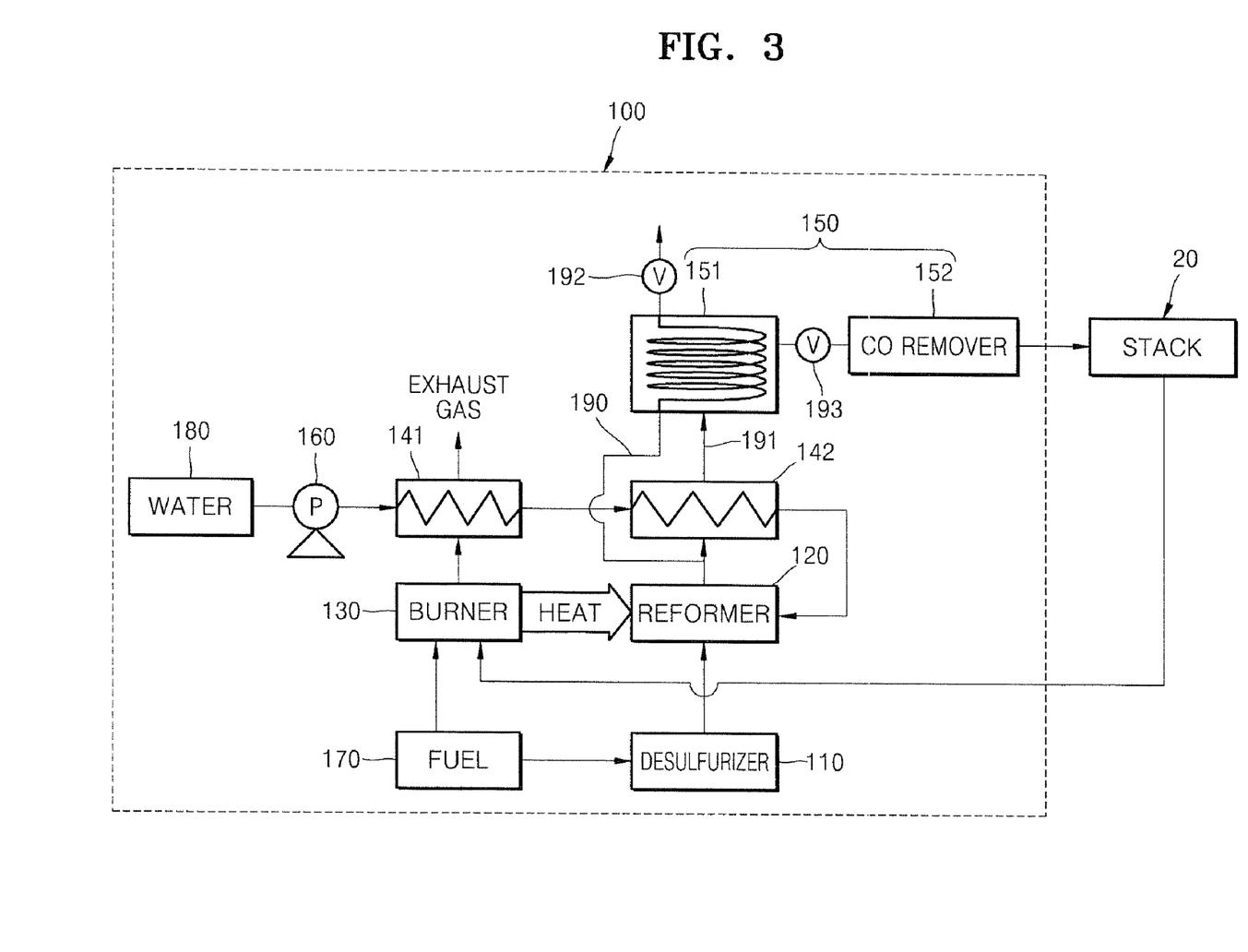
FIG. 3 is a block diagram showing a configuration of a fuel processor according to an embodiment of the present invention.
Figure 4:
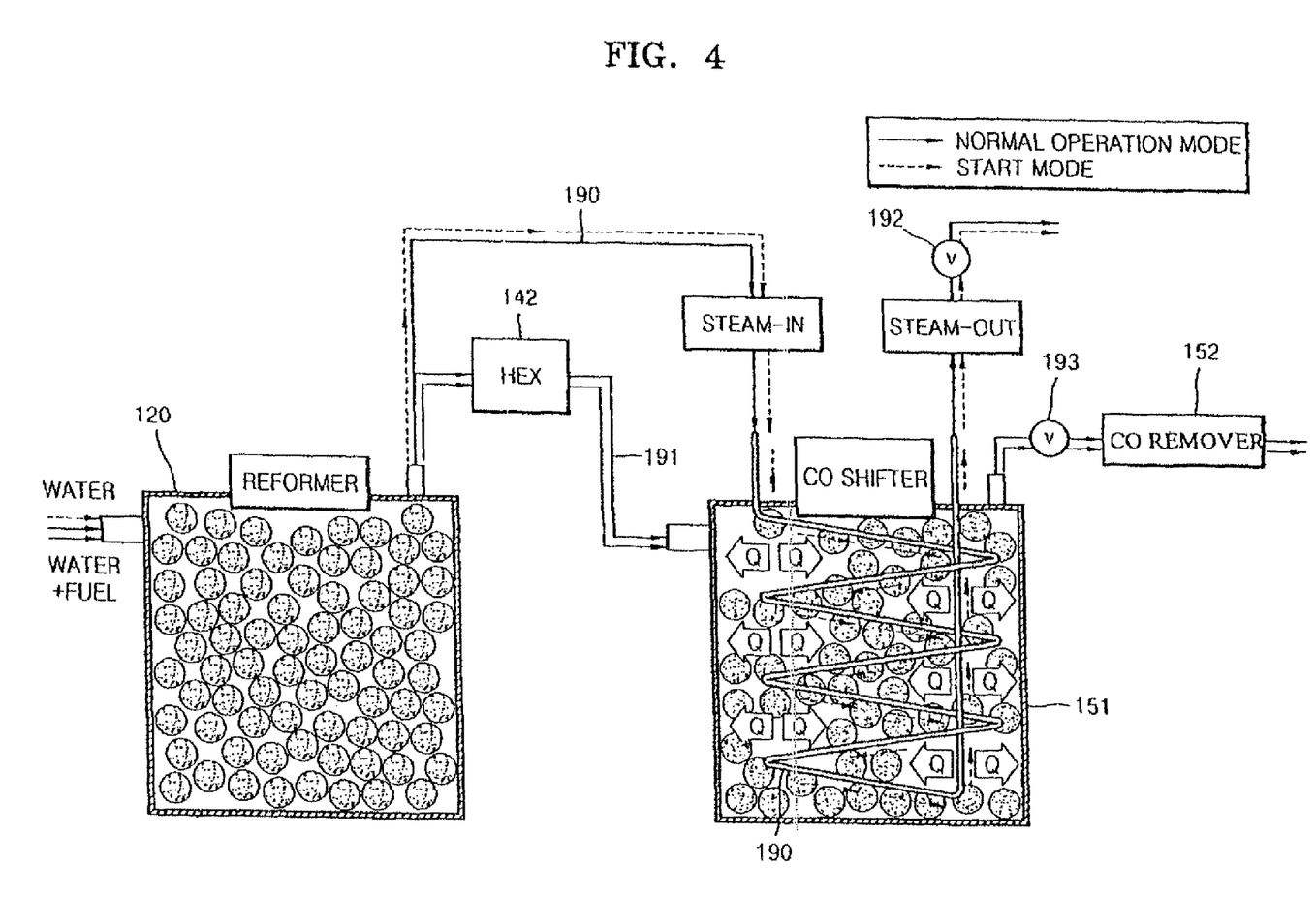
FIG. 4 is a schematic drawing illustrating a connection structure between a reformer and a CO shifter of the fuel processor of FIG. 3, according to an embodiment of the present invention.

FIG. 3 is a block diagram showing a configuration of a fuel processor 100 according to various aspects of an embodiment of the present invention, and FIG. 4 is a schematic drawing illustrating a connection structure between a reformer and a CO shifter of the fuel processor 100 of FIG. 3, according to various aspects of an embodiment of the present invention. The fuel processor 100 includes a desulfurizer 110, a reformer 120, a burner 130, and a CO removal unit 150 comprising a CO shifter 151 and a CO remover 152. The fuel processor 100 has a basic structure such that when a raw gas, for example natural gas, is supplied from a fuel tank 170, sulfur components included in the raw gas are removed by adsorption in the desulfurizer 110, and hydrogen that is to be supplied to a stack 20 is extracted in the reformer 120, by reacting the raw gas with steam supplied from a water tank 180. The steam can be supplied by a pump 160. CO produced in the above process is reduced to an amount of about 0.5% or less while passing through the CO shifter 151, and is further educed to about 10 ppm or less after passing through the CO remover 152. Reference numerals 141 and 142 respectively indicate first and second heat exchangers for preheating water to be supplied to the reformer 120.

The fuel processor 100 additionally comprises a rapid heating structure for the CO shifter 151, so as to allow the CO shifter 151 to rapidly reach a normal operating condition when the fuel processor 100 starts.

Referring to FIG. 4, a medium path line 190 through which a heat exchange medium, for exchanging heat between the reformer 120 and the CO shifter 151, passes is provided separately from a fuel line 191, through which a raw gas is supplied to the reformer 120 and the CO shifter 151. The medium path line 190 can be a conduit, tube, or any other suitable configuration for containing and transporting a fluid. At an early stage of start up, as indicated by a dotted line shown on FIG. 4, the heat exchange medium absorbs heat from the reformer 120, and delivers the heat to the CO shifter 151, by way of the medium path line 190, thereby rapidly increasing the initial temperature of the CO shifter 151. Here, the heat exchange medium is water supplied from the water tank 180, and the medium path line 190 is rolled up in a coil shape to increase its contact area with the CO shifter 151.

During a normal operation, as indicated by a thread line shown on FIG. 4, hydrogen gas produced through a reaction between water and the raw gas in the reformer 120, is supplied to the CO shifter 151, and to the CO remover 152, by way of the fuel line 191. After the CO is sufficiently removed, the hydrogen gas is supplied to the stack 20.

Valves 192 and 193 are respectively installed on outlets of the medium path line 190 and the CO shifter 151. By opening and closing the two valves 192 and 193, a start mode that performs the initial rapid heating is shifted to a normal operation mode that performs a normal operation after the start mode is complete.

A method of operating the fuel processor 100 having the above configuration will now be described.

The fuel processor 100 is operated with a start up mode for quickly heating up the reformer 120 and the CO shifter 151. The reformer 120 and the CO shifter 151 can begin startup at room temperature.

The temperature of an inner side of the reformer 120 is increased by igniting the burner 130. The temperature of the reformer 120 can reach 700° C. which is a normal operating temperature, in about 20 minutes since, as described above, the reformer 120 is directly heated by the burner 130.

When the temperature of the inner side of the reformer 120 reaches approximately 100° C., prior to reaching 700° C., the valve 192 is opened and the valve 193 is closed. The valve 192 can be located on an outlet side of the medium path line 190 and the valve 193 can be located on an outlet side of the CO shifter 151. The CO shifter 151 is connected to the fuel line 191. Water can be used as a heat exchange medium and, as indicated by the dotted line in FIG. 4, is supplied to the reformer 120 by operating the pump 160. At this time, a raw gas such as a hydrocarbon gas is not supplied, and only water is supplied to the reformer 120. In this case, the reformer 120 is heated by the burner 130, and the water supplied to the reformer 120 turns into steam by absorbing heat from the reformer 120. The steam moves to the CO shifter 151 along the medium path line 190 and heat exchange takes place while the steam passes through the CO shifter 151. Accordingly, the temperature of an inner side of the CO shifter 151 increases rapidly. That is, the steam that absorbs heat supplied by the burner 130 rapidly increases the temperature of the CO shifter 151, by releasing the heat while passing through the CO shifter 151. The steam that has passed heat to the CO shifter 151 is discharged out of the fuel processor 100.

According to some embodiments, when the temperature of the CO shifter 151 reaches approximately 100° C. from the heat released by the steam, the fuel processor 100 is shifted to a normal operation mode. The fuel processor 100 can be shifted to the normal operation mode when the temperature of the CO shifter 151 reaches between about 100° C. and about 200° C., with 200° C. being the normal operating temperature. However, once the temperature of the CO shifter 151 reaches about 100° C., raw gas can be supplied to the reformer 120 and the CO shifter 151 can be heated using the heat from the hydrogen gas generated from the reformer 120. Accordingly, in order to have a prompt start, the start up mode may be shifted to the normal operation mode before the operating temperature is reached.

In some instances problems arise when beginning operations with a load of 100%. Therefore, initially after shifting to the normal operation mode, the raw gas and water can be supplied at only approximately 50% of the normal load. In the normal operation mode, while the valve 192 is closed and the valve 193 is opened, the raw gas that has passed through the desulfurizer 110, and as indicated by a thread line 204 in FIG. 4, is supplied to the reformer 120 together with water from the water tank 180. Thus, hydrogen gas is produced in the reformer 120 by a reaction between the raw gas and the water, and is moved to the CO shifter 151, along the fuel line 191, to remove CO produced as a byproduct when producing the hydrogen gas. At this time, the CO shifter 151 is still heated by the heated hydrogen gas, and after some time reaches the target temperature of 200° C. From this point, the fuel processor 100 can be operated with a full load of the raw gas and water. That is, when the fuel processor 100 is shifted to the normal operation mode, a normal operation of the fuel cell occurs. During normal operation the hydrogen gas (and CO byproduct) produced in the reformer 120 moves to the CO shifter 151 by way of the fuel line 191. A The CO is sufficiently removed by the CO shifter 151 and the CO remover 152, the hydrogen gas is supplied to the stack 20.

Figure 5:
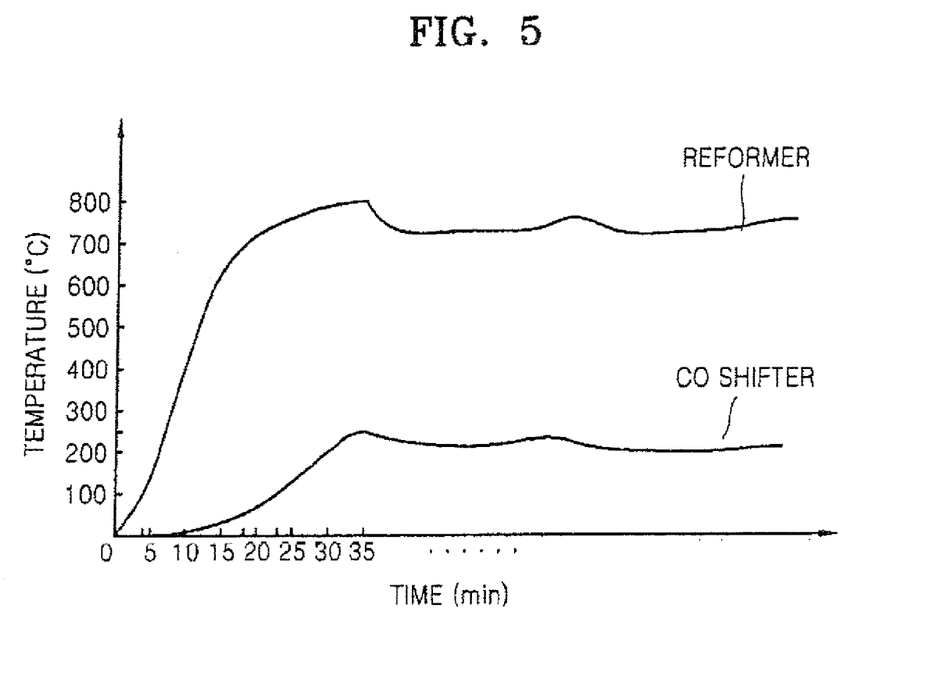
FIG. 5 is a graph showing the variation of internal temperatures of a reformer and a CO shifter when the fuel process of FIG. 3 starts up.

FIG. 5 is a graph showing the variation of internal temperatures of a reformer 120 and a CO shifter 151, when a fuel processor 100 is started. Referring to FIG. 5, the temperature of the reformer 120 reaches 700° C. in 15 to 20 minutes after the ignition of the burner 130. The temperature of the CO shifter 151 begins to increase from the point when steam is supplied after the ignition of the burner 130, and respectively reaches 200° C. and 250° C. in 30 minutes and 35 minutes after the start up. The result indicates that the initial heating time, required to increase the temperature of the CO shifter 151 to 200° C., can be reduced to almost half of the conventional time. Accordingly, the time required to enter a normal operation after start up of the fuel processor 100 can be significantly reduced as compared to the related art.

Figure 6:
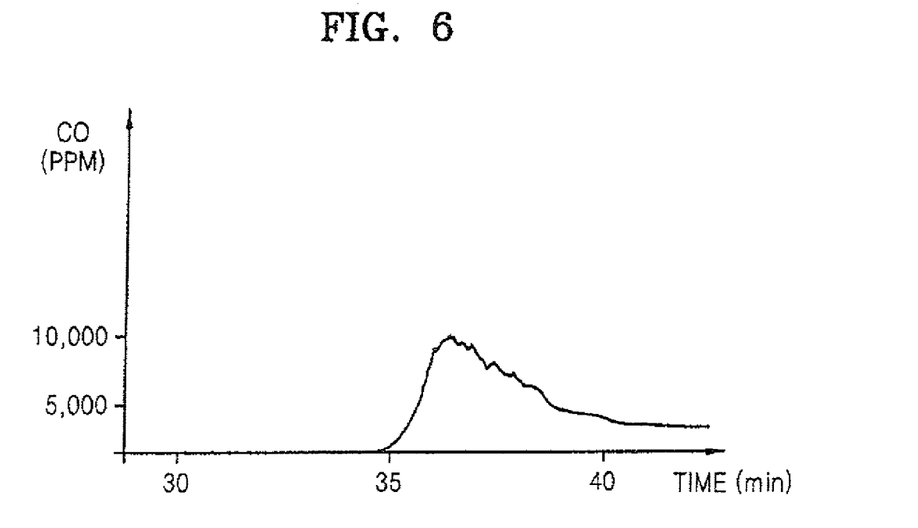
FIG. 6 is a graph showing the variation of CO content in an exit from a CO shifter when the fuel processor of FIG. 3 starts up.

FIG. 6 is a graph showing the variation of CO content detected at an exit of the CO shifter 151 when the fuel processor 100 of FIG. 3 starts up, as the same manner detailed in FIG. 5. Referring to FIG. 6, it is confirmed that the CO content in the hydrogen gas increases from the point at which the fuel processor 100 begins operating with a full load of the raw gas and water. Thereafter, the CO levels begin to decrease as the temperature of the CO shifter 151 is maintained at 200° C., or more. Approximately 40 minutes after the start up of the fuel processor 100, the CO content has been reduced below 5000 ppm, a level at which the CO remover 152 can reduce the CO content to less than 10 ppm. That is, the CO content in the fuel gas that has passed through the CO shifter 151 is below 5000 ppm, and the CO content of the fuel gas that has passed through the CO removal 152 is less than 10 ppm. Therefore, the fuel gas contains a CO content that can be supplied to the stack 20.

Therefore, considering both the time for rising temperature of the CO shifter 151 and the CO content in the hydrogen gas from the CO shifter 151, the fuel processor 100 can supply purified hydrogen gas to the stack 20, by opening a pipeline connected to the stack 20, approximately 40 minutes after the start up of the fuel processor 100. Compared to the related art, in which a waiting time of one hour is required to supply clean gas to the stack 20, the waiting time can be reduced by ⅓ or more.

As described above, a fuel processor according to aspects of the present invention provides the following advantages.

First, since it is possible that the CO shifter 151 can be rapidly heated at an early stage of start up, using heat exchanged from steam, the time required to reach a normal operation of the fuel processor can be greatly reduced.

Second, since the stand by time at the early stage of start up is reduced, restarting is easy after a stoppage, for example, a stoppage required for maintenance reasons.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A fuel processor comprising:
  a reformer that extracts hydrogen gas from a raw fuel by an extraction reaction with water;
  a burner that heats up the reformer to a temperature suitable for extracting the hydrogen gas;
  a CO (carbon monoxide) shifter that removes CO produced during the extraction reaction;
  a fuel line external to the reformer for moving the hydrogen gas from the reformer to the CO shifter; and
  a medium path line in which a heat exchange medium absorbs heat in the reformer and passes the heat to the CO shifter, wherein the medium path line external to the reformer is distinct from the fuel line, and wherein the medium path line is rolled up in a coil shape in the CO shifter.

2. The fuel processor of claim 1, wherein the medium path line is configured to transport water as the heat exchange medium.

3. A fuel processor comprising:
a reformer that extracts hydrogen gas from a raw fuel by an extraction reaction with water;
a burner that heats up the reformer to a temperature suitable for extracting the hydrogen gas;
a CO (carbon monoxide) shifter that removes CO produced during the extraction reaction;
a fuel line external to the reformer for moving the hydrogen gas from the reformer to the CO shifter; and
a medium path line in which a heat exchange medium absorbs heat in the reformer and passes the heat to the CO shifter, wherein the medium path line external to the reformer is distinct from the fuel line, and wherein the medium path line is rolled up in a coil shape in the CO shifter.

4. The fuel processor of claim 1, further comprising a CO remover that removes CO produced during the extraction reaction.

5. A fuel cell system comprising the fuel processor of claim 1.

6. A fuel processor comprising:
a reformer to produce hydrogen from a raw gas;
a burner to heat the reformer;
a CO shifter to remove CO from the hydrogen produced in the reformer;
a fuel line external to the reformer for moving the hydrogen gas from the reformer to the CO shifter;
a medium conduit providing a fluid communication between the reformer and the CO shifter; and
a heat exchange medium disposed in the medium conduit to transfer heat from the reformer to the CO shifter, wherein the heat exchange medium is prevented from directly contacting the CO shifter by the medium conduit, wherein the medium conduit external to the reformer is distinct from the fuel line, and wherein the medium conduit is rolled up in a coil shape in the CO shifter.

7. The fuel processor of claim 6, further comprising:
a first valve to control flow of the heat exchange medium in the medium conduit; and
a second valve to control flow of the hydrogen.

8. The fuel processor of claim 6, further comprising a CO remover to remove CO from the hydrogen which was not removed by the CO shifter.

9. The fuel processor of claim 8, further comprising a valve disposed between the CO shifter and the CO remover to control flow of the hydrogen.

10. The fuel processor of claim 6, wherein the heat exchange medium is water.

11. The fuel processor of claim 6, wherein the fuel line is separate from the medium conduit.

* * * * *